Feb. 19, 1957  A. C. TURNEY ET AL  2,782,019
INDIRECT HEAT CALCINING KILN
Filed July 25, 1952  12 Sheets-Sheet 1
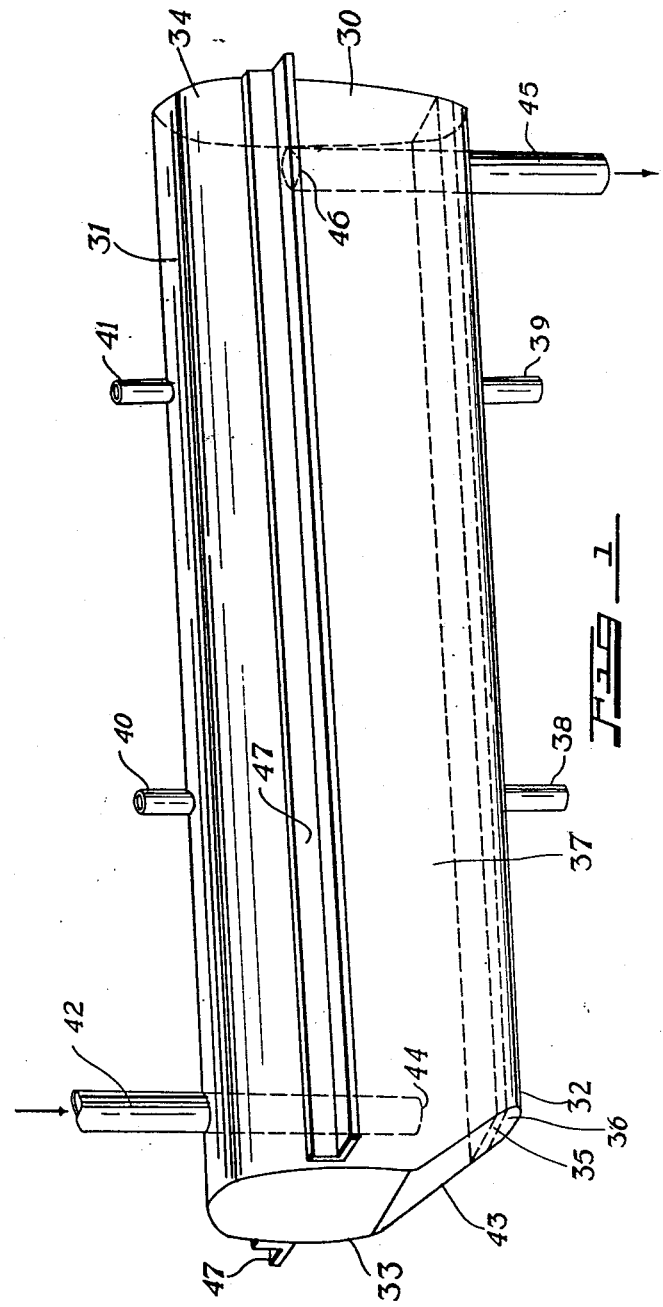
INVENTOR
ARTHUR C. TURNEY
BOLESLAW J. ZUBRZYCKI
BY Smart+Biggar
ATTORNEYS

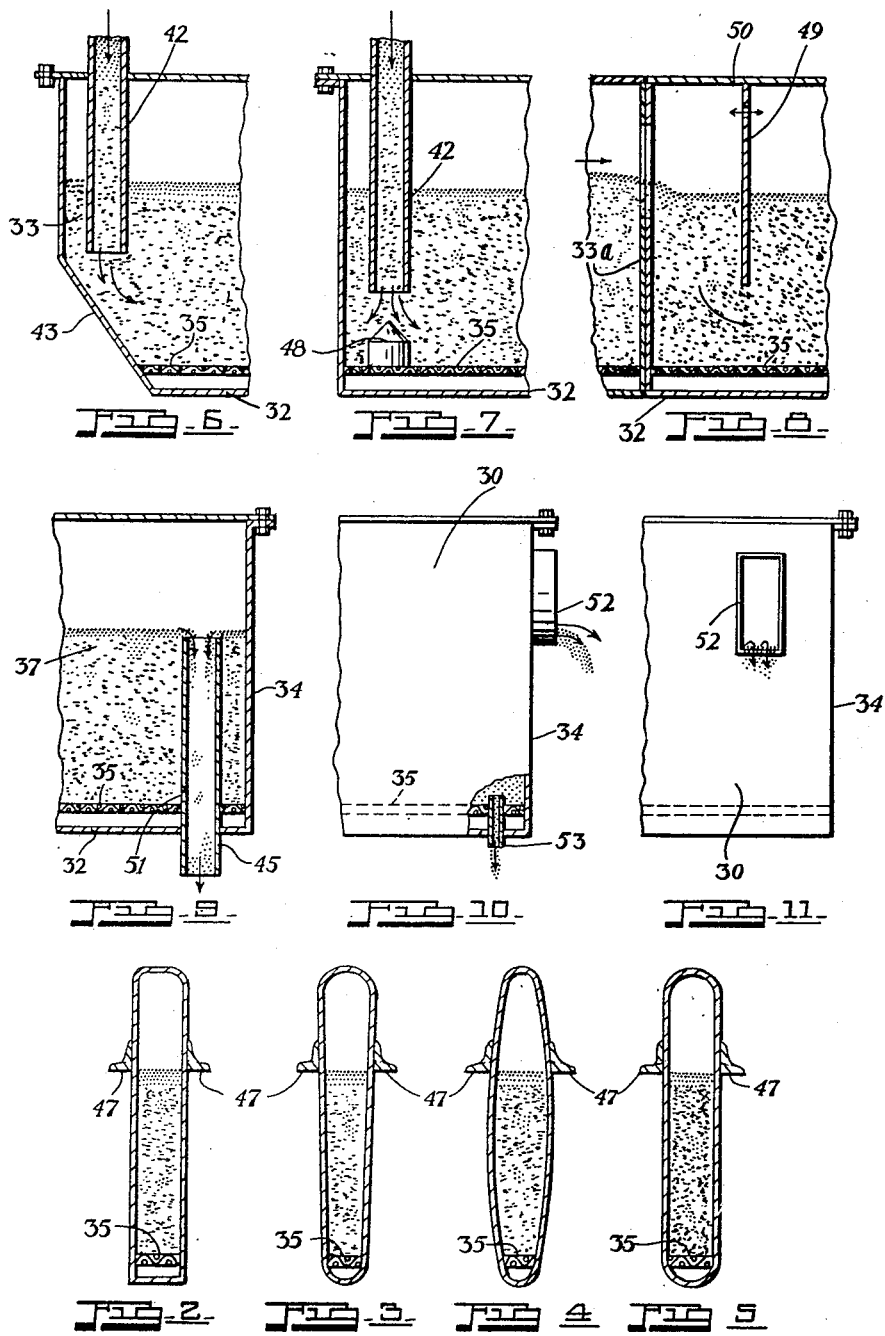

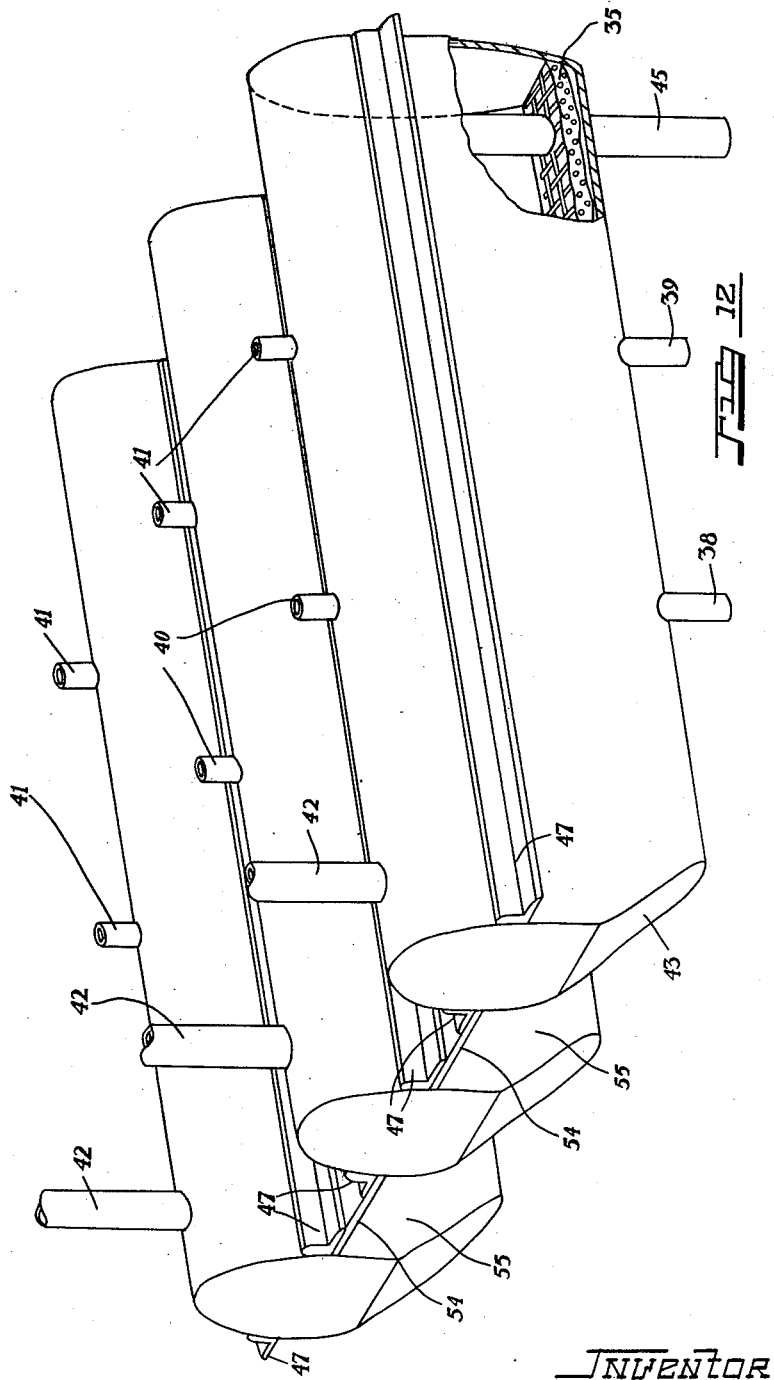

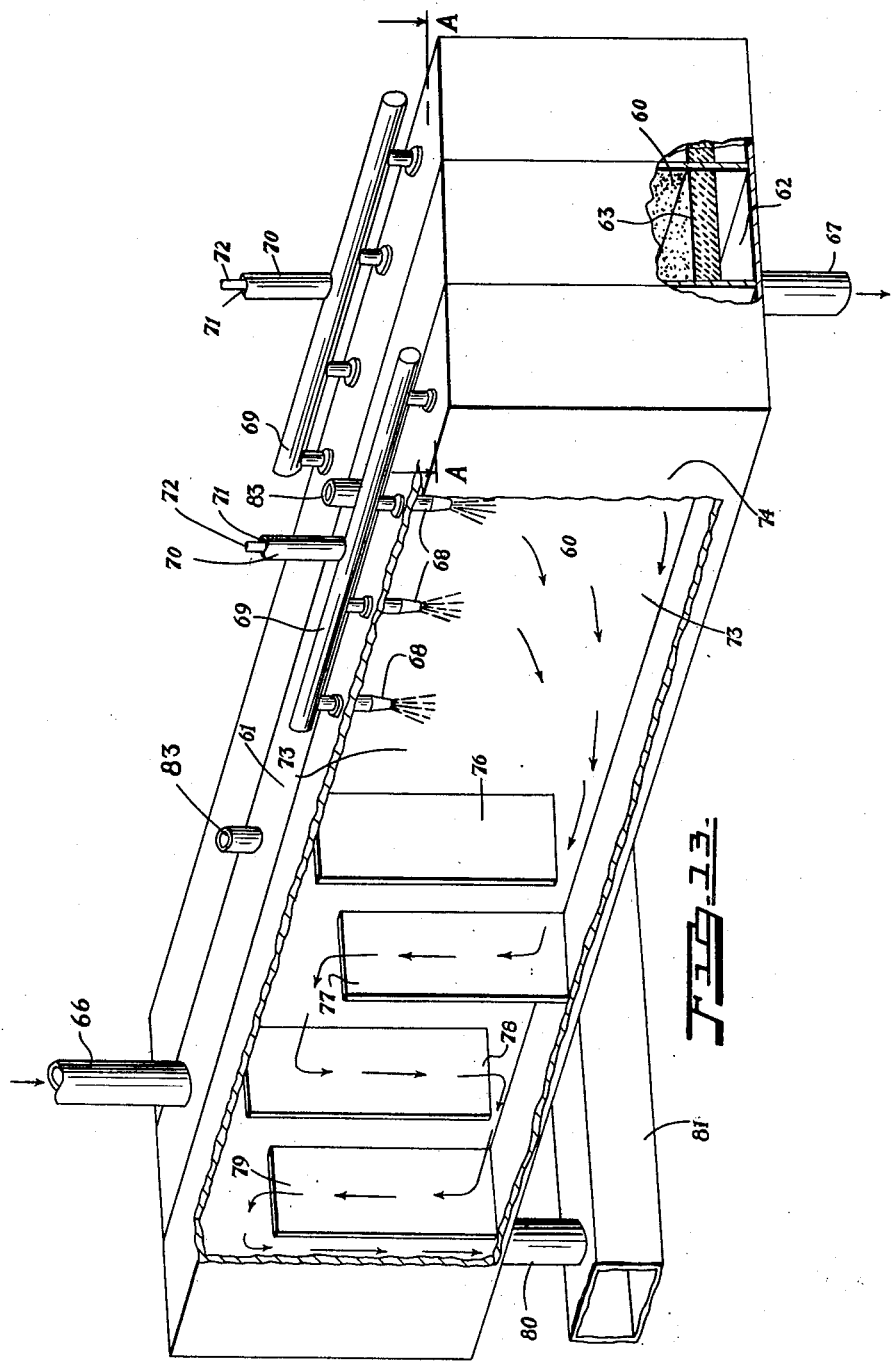

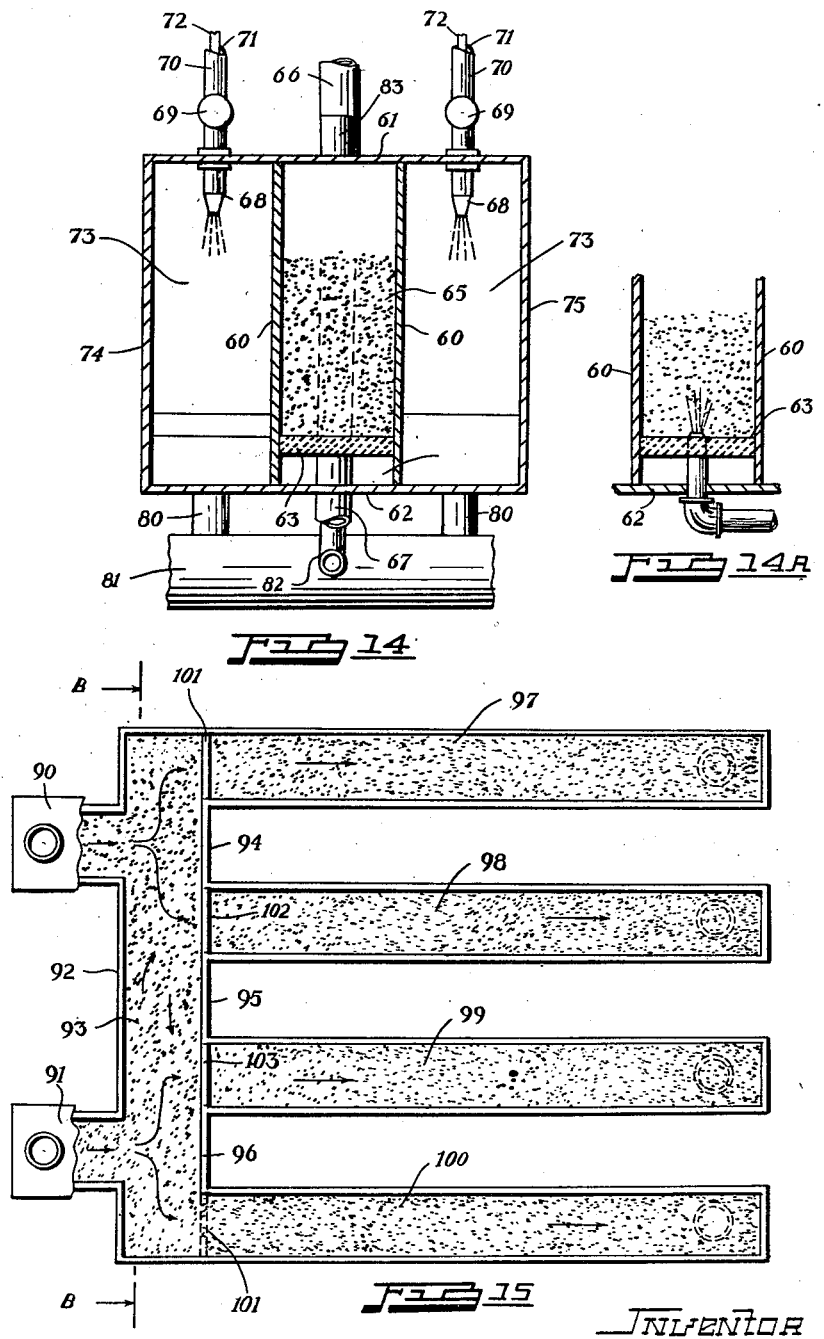

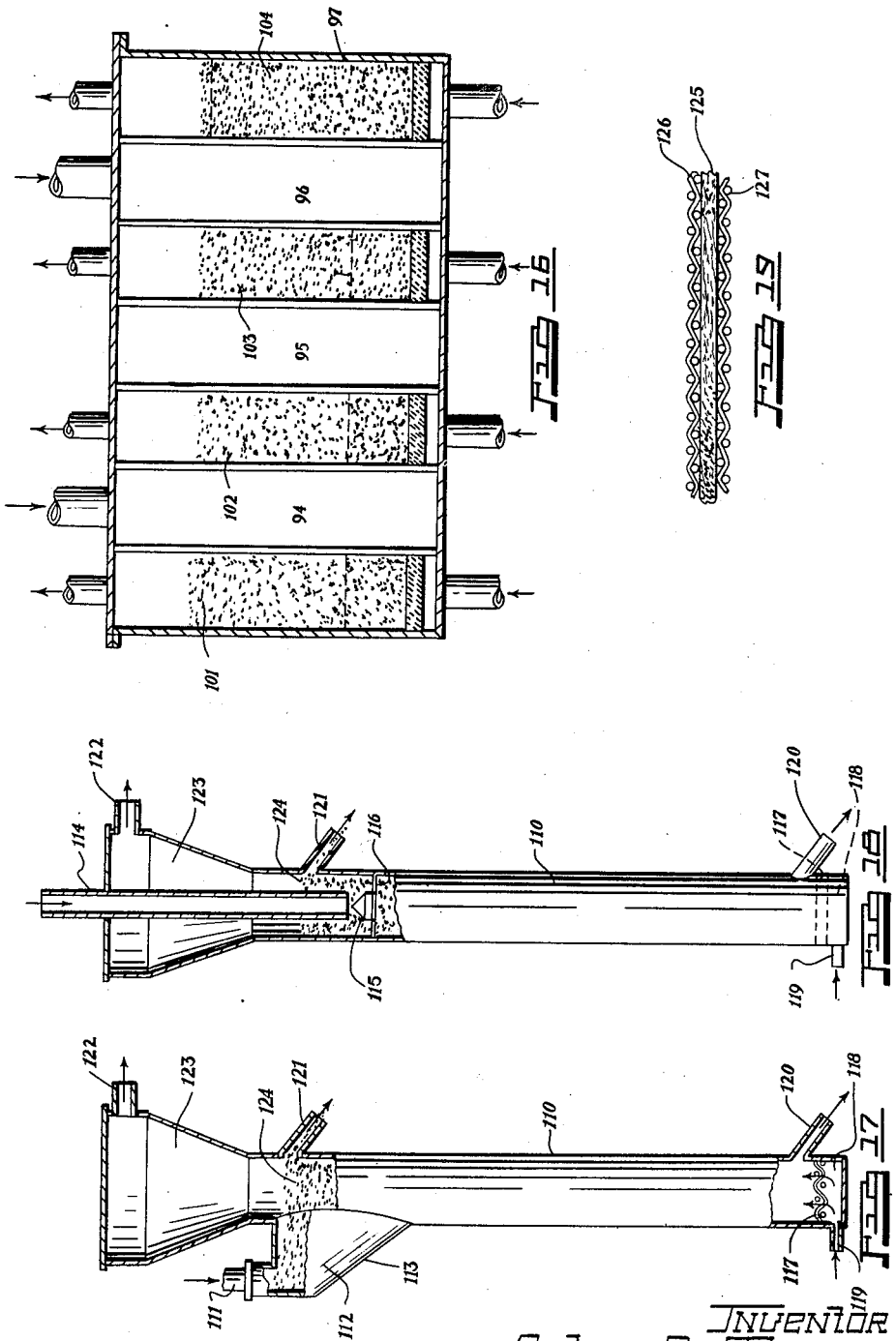

INVENTOR
ARTHUR C. TURNEY
BOLESLAW J. ZUBRZYCKI
BY - Smart & Biggar
ATTORNEYS

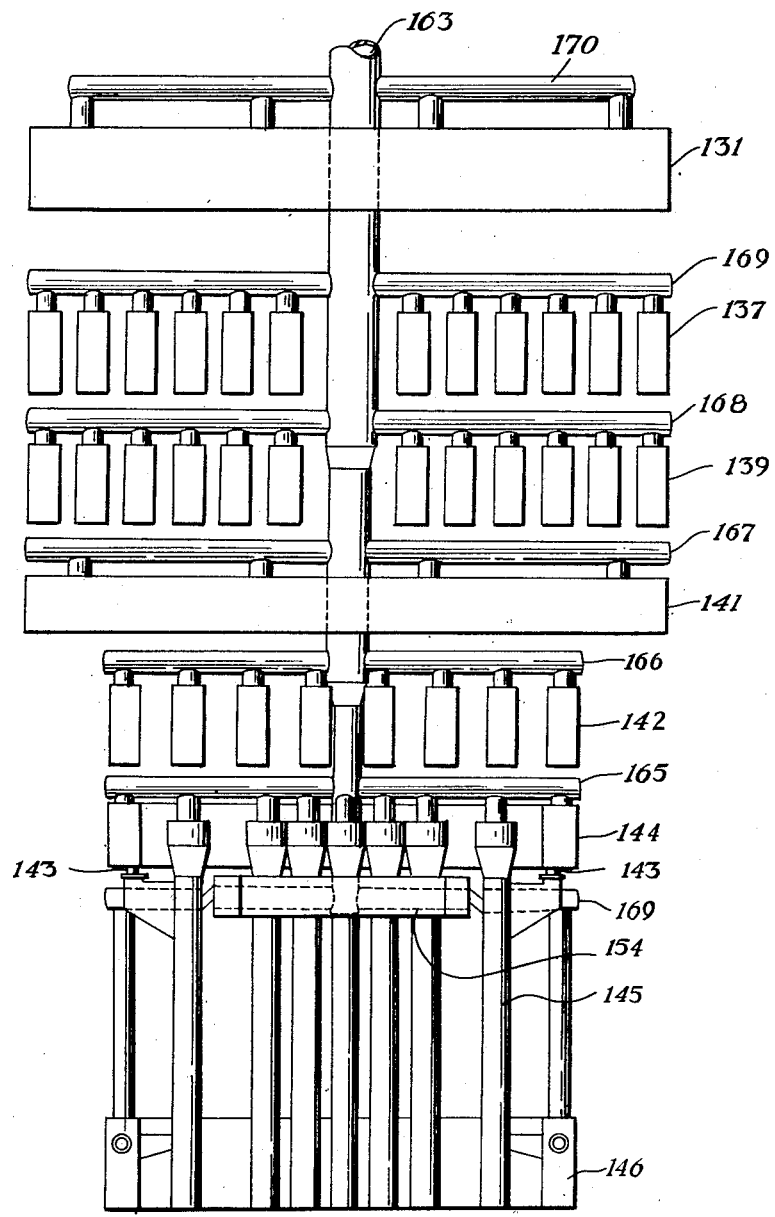

Feb. 19, 1957     A. C. TURNEY ET AL     2,782,019
INDIRECT HEAT CALCINING KILN
Filed July 25, 1952     12 Sheets-Sheet 10
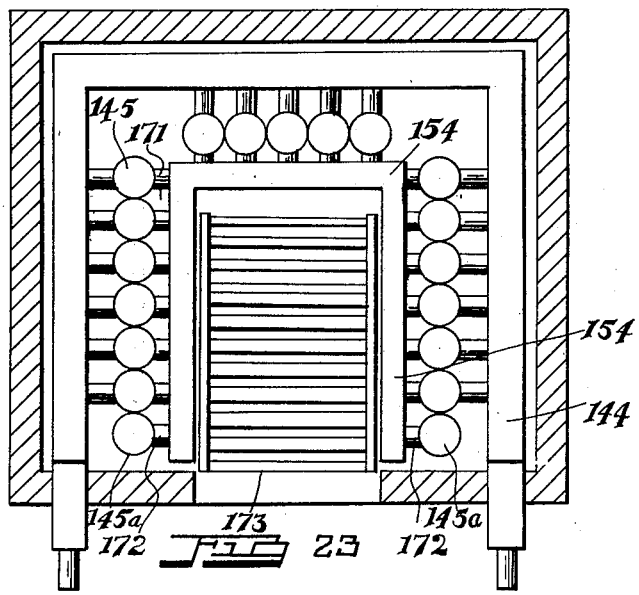
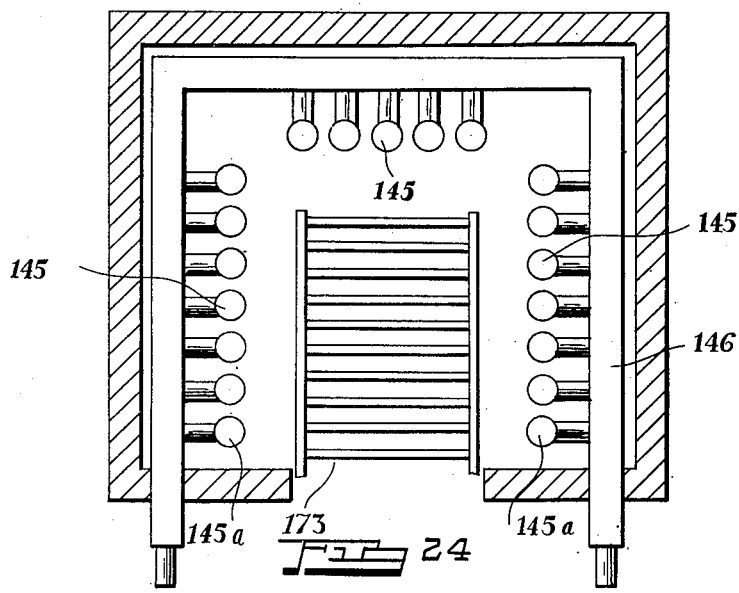
INVENTOR
ARTHUR C. TURNEY
BOLESLAW J. ZUBRZYCKI
BY- Smart + Biggar
ATTORNEYS

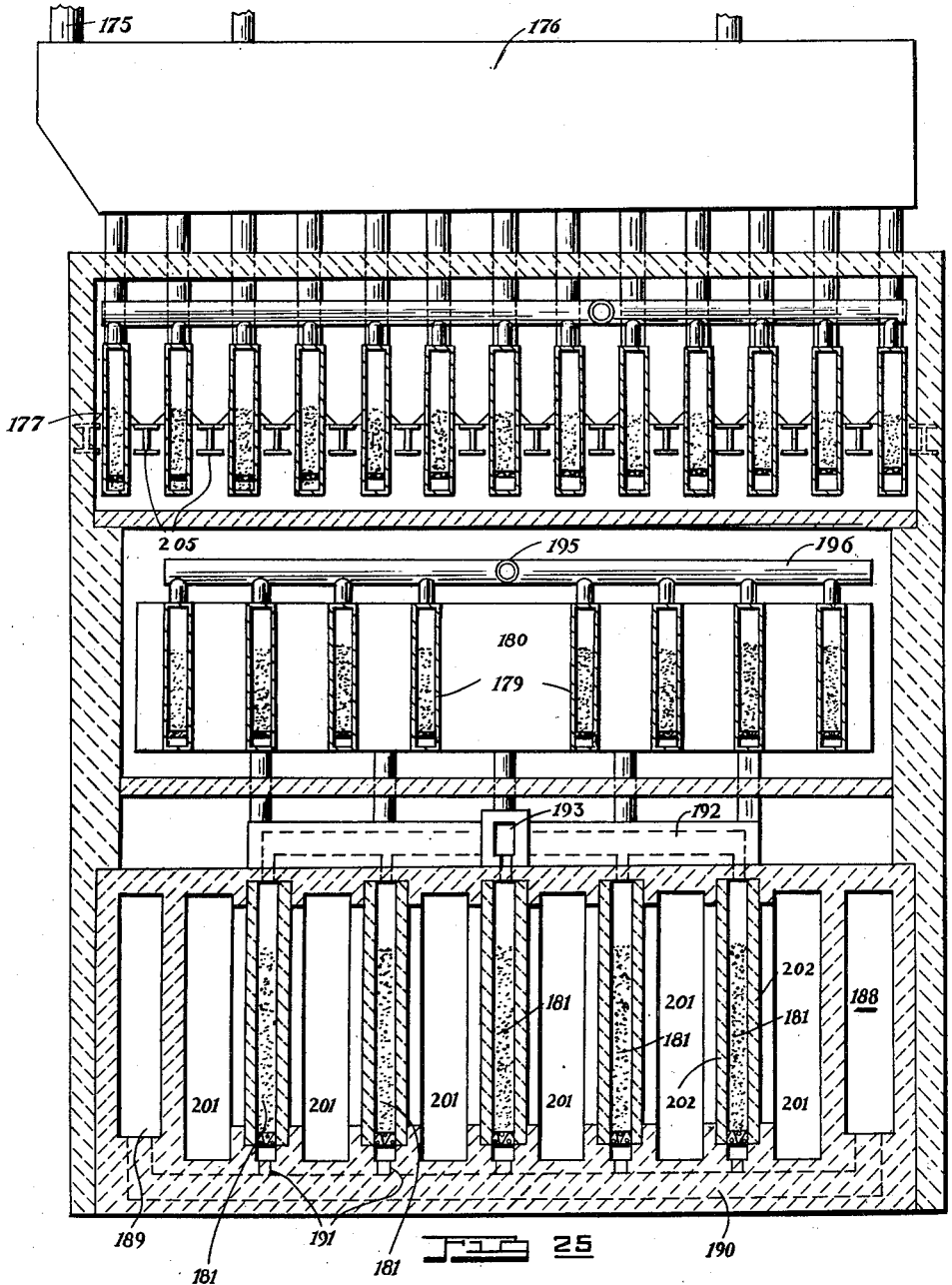

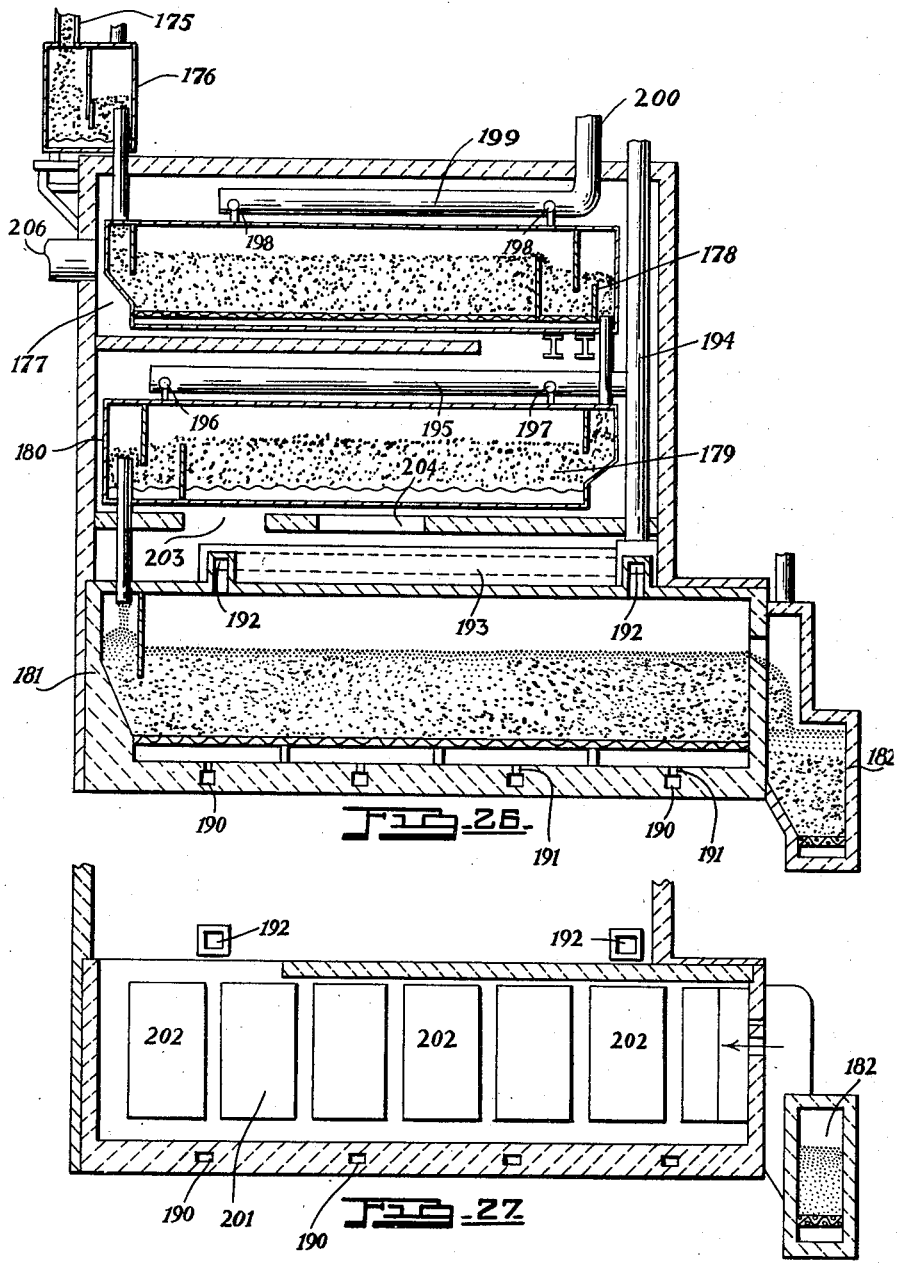

United States Patent Office 2,782,019
Patented Feb. 19, 1957

2,782,019

INDIRECT HEAT CALCINING KILN

Arthur Clinton Turney and Boleslaw J. Zubrzycki, Arvida, Quebec, Canada, assignors, by mesne assignments, to F. L. Smidth & Co., New York, N. Y.

Application July 25, 1952, Serial No. 300,994

13 Claims. (Cl. 263—21)

This invention relates to an apparatus for the treatment of finely divided fluidizable solid material.

In copending application Serial No. 237,032 filed July 16, 1951, there is described a method and apparatus for the treatment of finely divided fluidizable solid materials wherein the material is formed into a deep horizontally flowing fluidized bed which is heated progressively as it advances in a horizontal direction in order to carry out desired operations upon the material. The apparatus described in the said copending application takes various forms and in general comprises heating elements in contact with the fluidized bed which are arranged to deliver predetermined quantities of heat to the bed at predetermined temperatures so that the heating of the material flowing through the apparatus is carried out in accordance with the heat requirements of the material at various temperatures for the operation being performed.

The heating elements described specifically in the said copending application are all situated within the fluidized bed and take the form of electrical resistors or tubular members through which a heating medium is circulated.

For many purposes, however, it is more convenient and economical to heat the fluidized bed indirectly by means of heated walls, and it is therefore the principal object of the present invention to provide apparatus for the treatment of finely divided fluidizable solid materials in which the material as it flows horizontally in a deep fluidizable bed may be heated progressively by radiant wall surfaces on either side of the apparatus.

It is another object of the present invention to provide such an apparatus wherein heat is transferred through the walls of the apparatus to a deep horizontally flowing bed of the material in varying quantities and at varying temperatures in accordance with the heat requirements of the material for the particular operation being performed.

It is a further object of the present invention to provide units within such an apparatus which are particularly designed for treatment of the material at temperatures up to about 1,000° F. and other units within the said apparatus which are particularly designed for the treatment of the materials at temperatures above about 1,000° F.

It is a further object of the invention to provide an apparatus of the type described in which low grade fuel may be used to supply the necessary heat without contaminating the product produced.

It is a still further object of the present invention to provide an apparatus of the type described wherein sensible heat may be recovered from the hot product of the process being performed and used for instance in the production of process steam or the like.

It is a still further object of the invention to provide a plant for the heat treatment or calcination of various material or the carrying out of various chemical reactions upon the said materials in a continuous manner with a maximum of heat economy.

It is a still further object of the invention to provide a plant of the type described which may be combined with a steam generating plant in a particularly efficient and economical manner.

Various other objects and advantages of the invention will become apparent as the specification proceeds.

Broadly speaking, the apparatus of the invention comprises means for providing a deep fluidized bed of finely divided fluidizable solid material in which the bed is confined in a comparatively narrow channel between two heat transmitting walls, the width of the bed being between about 6" and 36", and preferably in the neighbourhood of about 24".

For apparatus which is designed to operate at temperatures below about 1000° F., the heat transmitting walls will be formed from a suitable metallic material, while for apparatus designed to operate at temperatures above about 1000° F., the heat transmitting walls will be formed from a refractory ceramic material having a high heat conductivity such for instance as silicon carbide or the like.

The design of the plant for the continuous carrying out of any particular operation will, of course, vary depending upon what particular operation is to be carried out in each case. However, in all cases such a plant will involve the use of one or more of the following elements described in some detail hereinafter.

1. Horizontal flow metallic retorts.
2. Flow distributors.
3. Vertical retorts.
4. Horizontal flow high temperature retorts.

Of the above, of course, the basic elements according to the invention are numbers 1 and 4, while elements 2 and 3, when used in various combinations with the basic elements 1 and 4 in the construction of a plant, lead to a number of important advantages as will be apparent from the detailed description which follows.

Various embodiments of the apparatus according to the invention are described in some detail in the following specification with reference to the accompanying drawings, wherein:

Figure 1 is a perspective view of a low temperature retort according to the invention illustrating the general construction of the retort element.

Figure 2 is a vertical cross section of a retort of the type shown in Figure 1 illustrating one suitable shape for the cross sectional profile thereof.

Figure 3 is a vertical cross section of an apparatus of the type shown in Figure 1 illustrating an alternative shape for the cross sectional profile thereof.

Figure 4 is a vertical cross section of an apparatus of the type shown in Figure 1 illustrating a further alternative shape for the cross sectional profile thereof.

Figure 5 is a vertical cross section of an apparatus of the type shown in Figure 1 illustrating a still further alternative shape for the cross sectional profile thereof.

Figure 6 is a fragmentary longitudinal vertical section of the apparatus illustrated in Figure 1 showing details of the feed end of the retort.

Figure 7 is a fragmentary vertical section of a low temperature retort illustrating an alternative construction for the feed end of the retort.

Figure 8 is a fragmentary longitudinal section of the feed end of a low temperature retort illsutrating another alternative structure.

Figure 9 is a fragmentary vertical section of the discharge end of the low temperature retort illustrated in Figure 1 showing details of the construction thereof.

Figure 10 is a side elevation partly in section illustrating an alternative structure of the discharge end of a low temperature retort.

Figure 11 is a fragmentary side elevation of the discharge end of a low temperature retort illustrating a still further alternative form of construction.

Figure 12 is a perspective view of three low temperature retorts mounted side by side partly broken away to illustrate detail of a diaphragm.

Figure 13 is a perspective view of a high temperature retort according to the invention partly broken away to illustrate the interior structure thereof.

Figure 14 is a vertical cross section of the apparatus illustrated in Figure 13 taken along the plane AA in Figure 13.

Figure 14a is a fragmentary section showing an alternative embodiment of the high temperature retort illustrated in Figures 13 and 14 making use of an auxiliary burner within the bed.

Figure 15 is a plan view principally in horizontal section illustrating the manner in which four retorts according to the invention may be fed from two other retorts making use of a flow distributor.

Figure 16 is a vertical section taken along the plane BB of Figure 15.

Figure 17 is a side elevation partly in section of one form of a vertical retort of use according to the invention.

Figure 18 is a side elevation partly in section of an alternative form of vertical retort of use in connection with the invention.

Figure 19 is a fragmentary vertical section of the preferred form of diaphragm used in the fluidizing apparatus of the invention.

Figure 22 is a vertical view illustrating the manner of exhausting the fluidizing gases according to the invention.

Figure 23 is a horizontal section taken on the plane CC of Figure 20, and

Figure 24 is a horizontal section taken along the plane DD of Figure 20.

Figure 25 is a vertical section of a plant layout for the calcination of a material to high temperature.

Figure 26 is a vertical section on a slightly reduced scale of the plant illustrated in Figure 25, the plane of section being at right angles to the plane of section in Figure 25.

Figure 27 is a fragmentary section taken longitudinally through one of the burner sections of the plant illustrated in Figures 25 and 26.

Figure 20:
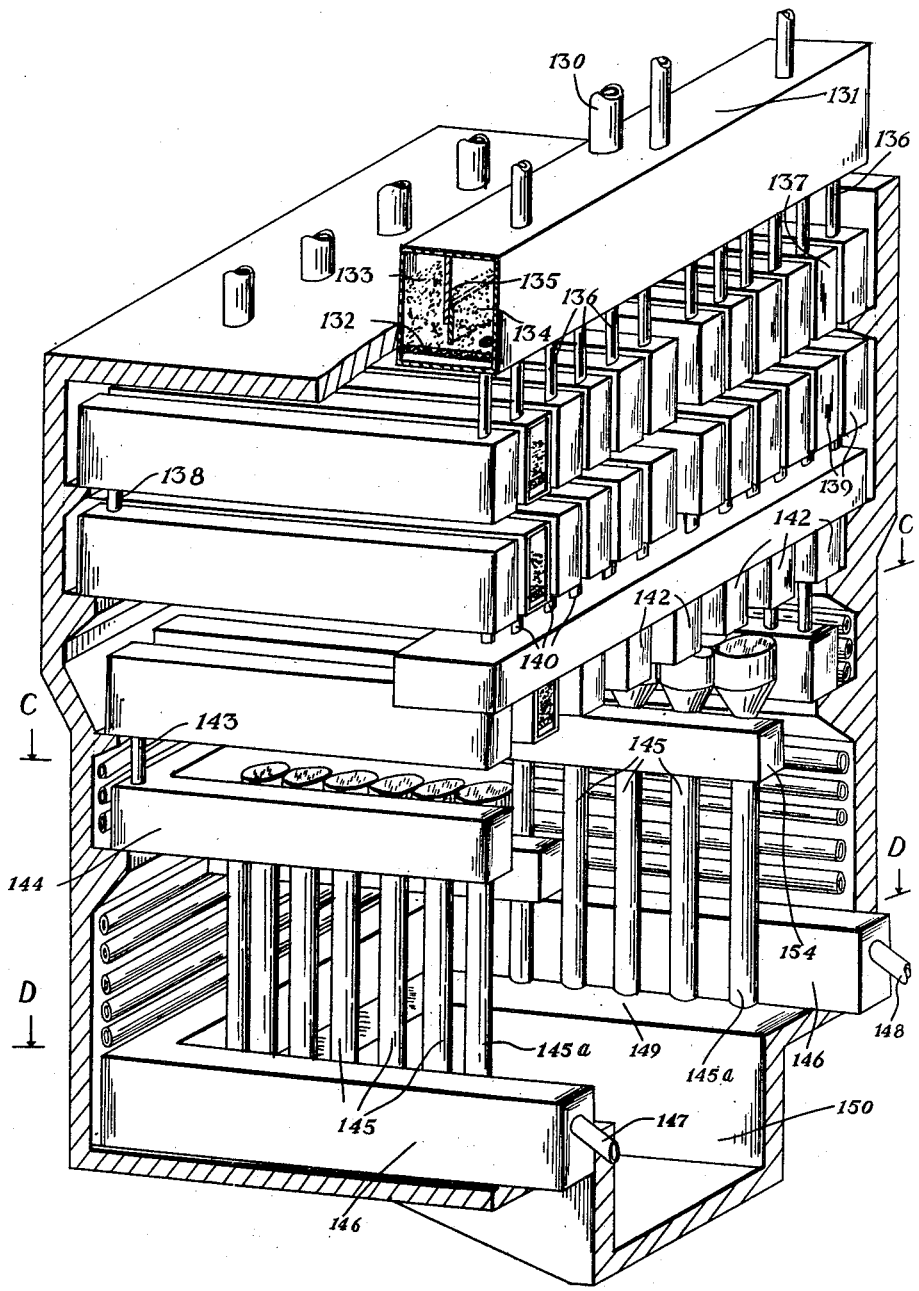
Figure 20 is a perspective view partly broken away to show the interior structure of a calcining plant according to the invention embodying the use of low temperature retorts and vertical medium temperature retorts illustrating how the plant may be arranged to share furnace space with a steam generating plant.

Referring now more particularly to the drawings, the low temperature retorts of the invention are very simple in construction. Taking the embodiment illustrated in Figure 1 as a representative example, it will be observed that these retorts, which are preferably constructed of a refractory form of metal with a low coefficient of expansion, take the form of relatively deep, narrow tunnels bounded by the side walls 30, the top 31, the bottom 32 and the ends 33 and 34. The interior of the tunnel is divided throughout its length by the porous diaphragm 35 into a gas chamber 36 therebelow and a fluidizing chamber 37 thereabove. Means are provided in the form of the gas supply lines 38 and 39 for admitting a controlled flow of fluidizing medium to the gas chamber 36 while the roof 31 of the tunnel is provided with suitable discharge conduits 40 and 41 for withdrawing fluidizing medium from the top of the fluidizing chamber 37.

Finely divided material is supplied by gravity to the inlet end of the retort through the vertical delivery tube 42, and in the embodiment illustrated in Figure 1, the end 33 of the retort is formed with the inclined portion 43 extending beneath the discharge end 44 of the delivery tube 42. Finely divided material is withdrawn from the retort by means of the vertical discharge tube 45, which extends upwardly through the bottom 32 of the retort and the diaphragm 35 and upwardly into the fluidizing chamber 37 to terminate at a predetermined level as at 46, which predetermined level controls the depth of the fluidized bed which will be maintained within the retort during operation thereof.

It has been found convenient according to the invention to provide the low temperature retorts of the above described construction with longitudinal ribs 47 running lengthwise of the retort and secured to the exterior of the side walls at an elevation which corresponds to the top of the fluidized bed of material which will be maintained within the retort during operation. These longitudinal ribs 47 have a two-fold purpose. In the one instance, they provide rigidity which minimizes the tendency of the retorts to buckle when undergoing changes of temperature, but primarily the function of these ribs is to provide support for the retorts when mounted as components in a calcining plant in a manner confining the hot gases to those portions of the side walls of the retort through which heat is to be transferred to the bed of fluidized material within. This latter function of the ribs 47 will be elaborated more fully later on in the specification.

The design of low temperature retorts of the type represented by the embodiment illustrated in Figure 1 is subject to considerable variation to meet various conditions and meet limitations imposed by plant layout and by available construction materials.

It will be apparent to those familiar with the art that a metal retort of the type described will expand as it is heated, and the metal plate from which the retort is constructed may exhibit a tendency to buckle. This tendency can, as already mentioned, be minimized to some extent by the provision of the longitudinal ribs 47, but further refinements of design are capable of eliminating this tendency almost entirely. If the side walls are vertical and substantially flat, use may be made of corrugated plate. However, it has been found that by giving the retort a modified profile in cross section by rounding the top and bottom thereof or giving the profile a generally elliptical shape the tendency to buckle as the material of the retort is heated is eliminated. Examples of suitable profiles for the cross section of retorts of the type above described are illustrated in Figures 2, 3, 4 and 5.

In supplying the material to the intake end of these retorts, it has been found necessary to provide against upward movement of fluidizing medium through the bed forming air-locks in the delivery tubes. This may be accomplished according to the invention by ensuring that the incoming material flows by gravity into an unfluidized portion of the bed where the delivery tube is vertical, or alternatively, by having the delivery tube enter the end of the retort at an angle to the side or end wall thereof. In the embodiment illustrated in Figure 1, which is illustrated in greater detail in Figure 6, the delivery tube 42 discharges directly above the inclined portion 43 of the end wall 33 of the retort. The inclination of the inclined portion 43 is greater than the angle of repose of the material being treated, continually causing the material to flow in the direction of the arrows in Figure 6 until the material passes to a point vertically above the diaphragm 35 and becomes fluidized. A similar result is achieved by the arrangement illustrated in Figure 7 in which the conically topped block 48 is situated directly beneath the delivery tube 42 preventing fluidization of any of the material entering the retort until it has passed outside the circumference of the tube 42. In the alternative form of construction illustrated in Figure 8, the material to be treated overflows the gate 42 from the end of another fluidizing chamber to enter the retort through the end wall 33a. In this instance, an under flow baffle 49 is provided which uniformly distributes the inflowing material across the width of the bed. A smaller hole 50 is provided near the top of the under flow baffle 49 to equalize the gas pressures on both sides thereof.

Various alternative forms of structure may be utilized at the discharge end of the retorts. The material may, for instance, be withdrawn through a discharge tube 45 extending upwardly into the fluidizing chamber 37 to a predetermined level into the open end of which the material of the bed will overflow. It is advantageous to provide a small opening 51 just above the point at which the discharge tube 45 passes through the diaphragm 35 to enable the apparatus to be emptied of material when it is being closed down. This form of construction is illustrated in Figure 9.

On the other hand, an alternative structure is illustrated in Figure 10 wherein the material merely flows out through an overflow gate 52 formed in the end 34 of the retort. In this case, it is advantageous to have a small auxiliary discharge tube 53 extending into the discharge end of the retort to a point just above the diaphragm 35 to permit the apparatus to be emptied and to prevent the formation of stagnant portions within the end of the apparatus during operation. The overflow gate 52 may be positioned either in the end wall 34 as illustrated in Figure 10 or, alternatively, may be positioned in one of the side walls adjacent the end 34 as illustrated in Figure 11.

As previously mentioned the retorts of the type illustrated in Figure 1 and described above are adapted to be mounted in banks supported by means of the ribs 47. This manner of mounting is illustrated in Figure 12 which shows three such retorts mounted side by side, the retorts being suspended upon the horizontal baffles 54 by means of the ribs 47 so as to confine the hot gases with which the retorts are to be heated to the spaces 55 between the side walls of adjacent retorts and supply heat to said walls only up to a level corresponding to the level of the bed of fluidized material contained within each retort.

It will readily be observed that these retorts lend themselves to mounting in batteries and afford an easy means of directing the heating gases in a simple manner, while still providing for the possibility of removing and replacing any individual retort for repair or maintenance with the least possible disturbance to the installation as a whole. In Figure 12, the supporting structure of the plant and the support for the exterior ribs on the outside of the two outer retorts has not been shown, but any conventional supporting means may be employed which is built to withstand the temperatures encountered during operation of the apparatus. The retorts thus far described are particularly adapted for the treatment of materials up to a maximum temperature of approximately 1,000° F., and their convenient construction as above described permits their disposition in various arrangements for heating by means of hot flue gases. They are particularly useful during the treatment of materials within temperature ranges within which the material being treated evolves gaseous products, since such gaseous products may be withdrawn substantially as formed and do not interfere to any extent with the maintenance of ideal fluidizing conditions within the retort. It will be observed that this advantage is one not possessed by vertical retorts where gaseous products formed during treatment must rise through the entire bed lying above the point of evolution, thus tending to unduly increase the space velocity of gases within the retort near the top thereof and cause undue losses of material by entrainment in the withdrawn fluidizing medium.

The high temperature retorts according to the invention are basically the same as the low temperature retorts with the exception that due regard must be had for limitations in design imposed by the nature of the construction materials which must be used to withstand the high temperatures encountered. Accordingly, it has been found convenient in designing the high temperature retorts (which will in general be constructed with the heat conducting walls thereof formed from silicon carbide or some similar highly refractory, high heat conductivity material) to provide suitable burners and associated flue elements in conjunction with the side walls of each retort. A suitable arrangement illustrating the principal differences in design between the high temperature retorts and the low temperature retorts already described is illustrated in Figures 13 and 14.

Referring to Figures 13 and 14, it will be observed that the retort itself comprises the side walls 60, the top 61, and the bottom 62 which are arranged to form a relatively deep narrow elongated tunnel which is divided horizontally by the diaphragm 63 into a gas chamber 64 and a fluidizing chamber 65. Material is fed to the fluidizing chamber through the delivery tube 66 and is removed from the retort through the discharge tube 67, the details of operation of the feed and discharge being the same as for the low temperature retort illustrated in Figure 1. The retort is flanked on either side by furnaces comprising, for instance, the burners 68 fed from the manifolds 69 which in turn are fed by the ducts 70. The type of burner illustrated has been found suitable in many cases but various other types of burner capable of producing a flame of the required temperature are equally suitable. Air for the combustion is fed co-axially with the fuel through the annular space 71 between the outside of the duct and the fuel line 72. The air and fuel are preferably preheated. The burners 68 are enclosed within the space 73 which serves as a combustion chamber, and is defined by the side walls 74 and 75 and extensions of the top 61 and bottom 62 of the retort. The alternate underflow and overflow baffles 76 and 77, 78 and 79, are disposed within the combustion chamber causing the hot products of combustion to follow the tortuous path indicated by the arrows before being withdrawn downwardly through the flue 80 into the hot gas manifold 81. The gases in the manifold 81 are still hot and may be used for the heating of low temperature or medium temperature retorts of the type illustrated in Figure 1. Suitable supply lines 82 supply fluidizing medium to the gas chamber 64 in controlled quantities and fluidizing medium is withdrawn from the top of the fluidizing chamber through the stacks 83.

The structure of the walls of the apparatus illustrated in Figures 13 and 14 is shown diagrammatically for simplicity of illustration since the actual structure of them is conventional. The materials must be selected having regard to the high temperature of the retort which may be as high as 1900° F. at the discharge end thereof. Generally speaking, the exterior structure forming the walls 74, 75, the top 61 and the bottom 62 will be conventional fire brick backed by a suitable supporting structure, while the heat conducting walls 60 of the retort will be composed of a high heat conductivity refractory material, such as silicon carbide or the like. The length of the apparatus may be varied to suit the operation being carried out, the governing feature in this regard being the heat conductivity of the heat conducting walls 60. From available thermal data, it may readily be calculated how many units of heat are required to be transferred into the material undergoing treatment in order to carry out the operation which is contemplated, and this may be related to the horizontal velocity of the bed to determine what quantity of heat per minute must pass through the heat conducting walls 60. Normally, in the design of such a retort, the space velocity of the fluidizing medium and the rate of feed of fresh material to the fluidizing bed (which governs the horizontal rate of flow thereof) will be arbitrarily selected at values which produce ideal fluidization of the bed. The length of the tunnel will then be determined by the quantity of heat which must be passed thereinto the accomplish the desired operation. It will be appreciated, however, that once the unit is in operation, the amount of heat transfer to any unit volume of the material in the bed during its passage through the apparatus may be controlled by varying the rate of feed of fresh material to the retort which varies the horizontal velocity of the bed.

These high temperature retorts may be mounted side by side in banks with a comon combustion chamber between each of the adjacent retorts, or they may, if desired, with suitable structural alterations be mounted one above the other.

The practical operation of the retorts described, both high temperature and low temperature, is dependent upon maintaining a fluidized bed of material which is continually advancing horizontally, which is between 6" and 36" in width, and which has a depth substantially greater than the width thereof. For optimum results, however, due to the fact that it is desirable in an apparatus of this character to maintain a horizontal rate of flow of the bed greater than .2' per minute, and the fact that the wider the bed the slower the bed velocity must be due to the limited heat conducing capacity of the side walls of the apparatus, it is preferred to have the width of the bed between about 12 and 24". Bed widths of less than 6" give rise to undesirable surface phenomena tending to create lack of uniformity in the treatment, whereas bed widths that are greater than 36" create uneven conditions within the fluidized bed due to the development of cross currents and eddies in the flow of the material. The critical limiting factor militating against greater widths of bed than 36" is, however, the peculiar heat transfer characteristics of fluidized materials. Up to a distance of about 12" from the heating body, the transfer of heat to the fluidized material may be considered as being instantaneous. At greater distances, unpredictable factors come into effect. We have found that when a fluidized bed is confined between two heating walls that are up to 36" apart, we may, as a practical matter, consider that transfer of heat to all parts of the bed is substantially instantaneous, but spacing of the heating walls further apart quickly introduces considerable error in heat transfer calculations. Thus, the basic underlying factor in this invention is the discovery that, provided the fluidized bed is between about 6" and 36" in width, transfer of heat to it through vertical heat conducting walls, confining the bed on either side, can be carried out in a highly efficient manner.

In certain circumstances, it may be found desirable to augment the heat transferred to the material through the heat conducting side walls 60 by placing one or more burners within the fluidized bed, for instance, as illustrated in Figure 14a wherein the burner 82 projects its nozzle just above the level of the diaphragm 63. This type of arrangement may prove advantageous in the treatment of relatively coarse material within the upper end of the size range which can be effectively fluidized. In these coarser materials, the instantaneous nature of heat transfer within the fluidized bed is altered to some extent by the fact that it will require a measurable time for heat to penetrate through the surface of each individual particle to the interior thereof, which time will, of course, depend upon the heat conductivity of the material being treated. We prefer, however, not to introduce burners directly within the fluidized bed in the case of any but the coarsest materials since conditions of fluidization in that part of the retort will be disturbed and the entrainment losses will be greatly increased. Contact burners have the disadvantage that the fuel used must be of high grade to avoid contaminating the material being treated with the products of combustion.

The basic elements of the apparatus of the invention, that is to say, the high temperature retorts and the low temperature retorts previously described, may be arranged in a plant in a variety of ways, and may be adapted in such arrangement to the thermal characteristics of the material which is to be treated. In so adapting the apparatus, it will, of course, be desirable insofar as it is considered expedient to supply heat to the material passing through the apparatus in accordance with the heat requirements of such material at said particular range of temperature. For instance, more heat will be required by the material within temperature ranges where endothermic reactions or structural rearrangements are taking place within the material, while less heat will be required within temperature ranges where exothermic reactions or changes in structure are taking place. In the apparatus of the invention, adaptation to provide for the variation in heat requirements at various temperatures is quite simply accomplished by arranging the various retorts forming the plant in such a manner that the temperature ranges involving absorption or emission of heat by the material take place entirely within one retort, and controlling the horizontal bed velocity within that retort so that the material is in the retort for only the length of time required to absorb the necessary heat.

By way of example, assuming that at temperature A the material must absorb four times as much heat as at temperature B, it will be found convenient to have two parallel retorts to treat the material at temperature A and have both these retorts feed into a common retort having the same dimensions, in which the material is treated at temperature B. Thus, the horizontal velocity of the material in the two retorts at temperature A will be only half the velocity of the material in the one retort at temperature B, and since there is twice as much heat conducting surface in the two retorts as in the one, roughly four times the heat will be absorbed by the material at temperature A as is absorbed by it at temperature B. Using this principle of arrangement, a plant may be constructed which will provide considerable accuracy of control of the heat introduced to the material at each stage of the heating process, and the heat supplied at any given temperature may be made to correspond to the heat requirements of the material at that temperature.

In arranging the retorts according to the above-mentioned principle, it is necessary to have some means of uniformly distributing the discharge of a number of retorts to the feed end of a different number of retorts. For this purpose, we make use of distributor troughs of which an example is illustrated in Figures 15 and 16, which show an arrangement whereby the discharge from two retorts is uniformly distributed to the feed end of four retorts.

Referring to Figures 15 and 16, it will be observed that retorts 90 and 91 discharge through the side wall 92 of the trough 93, which is similar in all respects to the retorts themselves with the exception that it is not necessarily intended to heat the material therein, and accordingly the side walls 92, 94, 95 and 96 will not be heat conducting but will rather be insulated to provide against heat losses.

The retorts 97, 98, 99 and 100 are all connected into the other side wall of the trough 93 communicating with the interior thereof through the spaces beneath the underflow baffles 101, 102, 103 and the space above the overflow baffle 104 respectively.

Since all the material in the distributor trough 93 is fluidized, the material fed in from the discharge of retorts 90 and 91 will distribute itself uniformly throughout the length of the trough, and the material will flow under the underflow baffles 101, 102 and 103 into the retorts 97, 98 and 99 respectively and will overflow the baffle 104 in the retort 100. It is preferred always to have one retort connected to the distributor trough by means of an overflow baffle in order to prevent overflowing the distributor trough should there be a sudden surge of material therein due to inadvertence on the part of the operators of the plant.

An arrangement similar to that shown in Figures 15 and 16 may be used to distribute the discharge of a larger number of retorts uniformly to the feed end of a smaller number of retorts. These distributor troughs are an important feature of the invention because they give complete versatility insofar as the capacity of the plant is concerned. Flow through any given trough is limited by the cross section of the trough, and the rate of horizontal flow therethrough which must be maintained to provide for adequate transfer of heat to the material. By running banks of retorts in parallel, however, and arranging the individual retorts in the manner above described, a plant may be designed having any desired capacity merely by varying the total number of retorts which are placed in parallel relationship.

In cases where no evolution of gas occurs during heating of the material within particular temperature ranges, it may be found desirable to make use of vertical retorts, in which case special advantages may be derived from a combination of horizontal and vertical retorts as will be hereinafter described in some detail.

Two examples of suitable vertical retorts are illustrated in Figures 17 and 18. These vertical retorts consist essentially of the hollow vertical cylinders 110 which are composed of relatively thin, refractory metal. The diameter of the retorts is governed by the same considerations as the width of the horizontal retorts and should therefore be between 6" and 36."

Material is fed to the retort illustrated in Figure 17 by means of a vertical delivery tube 111 which empties into a feed bag 112 found in the side of the retort. The hollow 113 of the feed bag 112 is sloped at an angle which is greater than the angle of repose of the material being treated so that material will flow by gravity into the interior of the vertical cylinder 110. It will be seen that this arrangement for feeding the retort corresponds with the method used in the horizontal retort illustrated in Figure 1.

In the retort illustrated in Figure 18, however, material is admitted in a manner which corresponds to that illustrated in Figure 7. Material enters the retort through the vertical delivery tube 114 which is coaxial with the cylinder 110, and extends downwardly to a point which is below the surface of the fluidized bed within the retort. To prevent formation of air-locks within the delivery tube 114, a conically surfaced baffle 115 is positioned directly beneath the lower end of the delivery tube 114 and supported in position in proximity thereto by four spaced supports 116 secured to the interior wall of the cylinder 110.

In both retorts, a horizontal diaphragm 117 is mounted near the bottom to provide a gas chamber 118 into which a controlled flow of fluidizing medium is fed through supply line 119. Material leaves the retorts through the downwardly sloping discharge conduits 120 which communicate with the interior of the retorts just above the diaphragms 117.

The level of the fluidized column of material within the vertical retorts is maintained constant at a desired level by means of the overflow pipes 121, while fluidizing medium leaves the top of the retorts through the exhaust ducts 122 after having first passed through the expanded portions 123 which reduce its velocity and cause it to lose most of the fines which have become entrained and carried upwardly from the bed surface 124. Vertical retorts of the type shown in Figure 17 are used in the plant layout illustrated in Figures 20–24.

Throughout the specification reference has been made to porous diaphragms through which fluidizing medium is passed upwardly into the material being treated. While any form of diaphragm having sufficient porosity, refractory equalities, and structural strength may be used, we have found it particularly desirable in many apparati involving horizontal flow of fluidized material to use a diaphragm having a substantial resistance to flow of fluidizing medium through it, since this results in more even fluidizing conditions and affords more accurate control.

Hence we generally prefer to construct the diaphragms of the low and medium temperature retorts in "sandwich" form as illustrated in Figure 19 where a layer of asbestos cloth 125 is sandwiched between two screens or perforated plates 126 and 127. The diaphragms in the high temperature retorts will, of course, as previously explained be composed of porous refractory material.

While many arrangements of the elements described above to suit particular operations will readily occur to those skilled in the art, in the treatment of materials which undergo no reactions involving evolution of gases during at least the upper ranges of temperatures encountered and where the whole operation does not involve heating the material to temperatures beyond those which may be withstood by metal retorts, a substantial advantage in heat economy may be obtained by arranging a calcining plant according to the invention in such a manner as to share furnace space with a steam generating plant. Such an arrangement is illustrated in Figures 20–24. In this plant, it is assumed that the calcination involves a dehydration step at about 200° C. requiring about 65% of the total theoretical heat and a surface activation step involving an endothermic change at about 550° C. Referring to Figures 20–24 inclusive, material is fed to the plant by gravity through the feed chute 130 which delivers it to the horizontal distributor trough 131. In this trough, the material is fluidized by fluidizing medium rising through the membrane 132, and the trough is divided longitudinally into a distributing chamber 133 and a delivery chamber 134 by the longitudinal underflow baffle 135. The material is delivered from the feed 130 into the distributing chamber 133 where it distributes itself evenly throughout the length of the trough 131, flows under the underflow baffle 135 into the delivery chamber 134 where it overflows the overflow pipes 136 which serve as feed chutes for the first row of low temperature retorts 137. Having passed through the row of retorts 137, the material is discharged through the overflow pipes 138 which serve as feed chutes for the second row of low temperature retorts 139 which is similar to the row of retorts 137. While passing through the rows of retorts 137 and 139, the dehydration step takes place, and the material is discharged through the overflow pipes 140 into the distributor trough 141 from which it is distributed uniformly into the third row of horizontal retorts 142 wherein it is heated from approximately 200° to approximately 550° C. without any changes of structure or composition taking place. From the third row of retorts 142, the material is discharged through the overflow pipes 143 into the U-shaped distributor 144 from which the material is distributed uniformly into the three rows of vertical retorts 145 in which the final heating step takes place. The material from these retorts is discharged into the U-shaped collector trough 146 and is discharged from the calcining apparatus through the two discharge chutes 147 and 148.

The vertical retorts 145 form a wall around the radiant zone of the combustion space 149 in the centre of the furnace. Powdered fuel is used in this case, and the ashes are collected in the ash pit 150. Details of the furnace have been omitted from Figure 20 for the sake of clarity of illustration, but the furnace itself is a conventional travelling grate powdered fuel burner such as is well known in the art.

Figure 21:
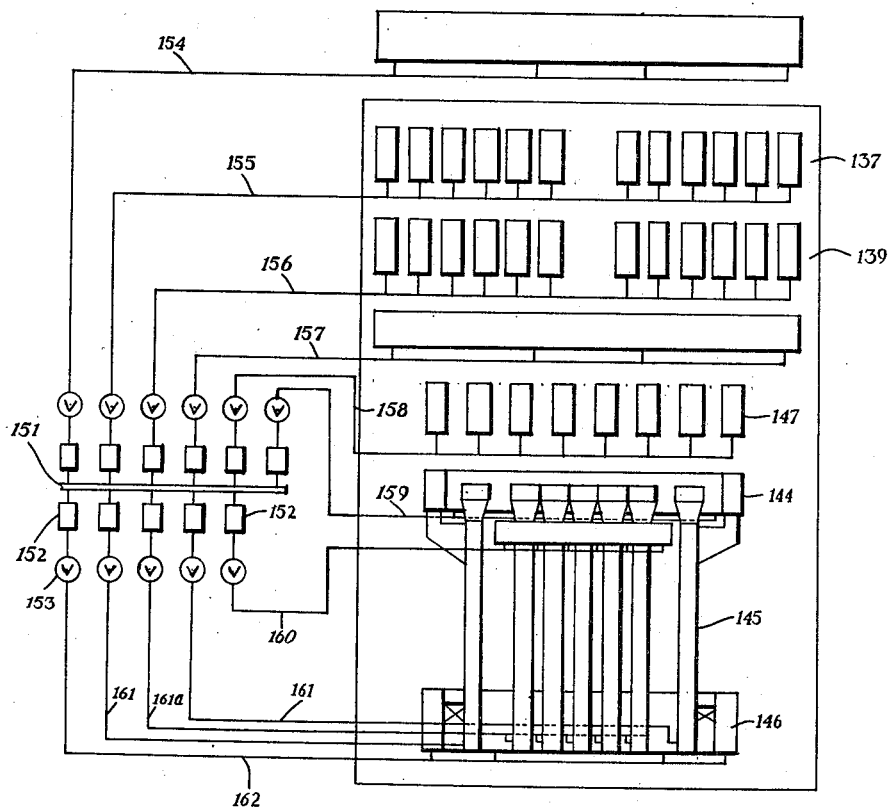
Figure 21 is a diagrammatic illustration of a suitable arrangement for distributing fluidizing medium to the plant illustrated in Figure 20.

Also omitted from Figure 20 for the sake of clarity are the systems for distributing fluidizing medium to the various fluidizing chambers and the means of collecting exhausted fluidizing medium from the tops of the various fluidizing chambers. These systems are illustrated in Figures 21 and 22 respectively. Fluidizing medium for the plant where the medium is air may suitably be distributed from a compressed airline in accordance with the system illustrated diagrammatically in Figure 21. Compressed air from the main supply line 151 is distributed individually to the various levels of the plant through a series of individual supply lines, each of which is provided with a metering device 152 (which may be either an orifice or a flow meter) and a control valve 153. All of the meter devices 152 and 153 may be conveniently mounted on a suitable control panel in a convenient location adjacent the plant. As illustrated diagrammatically, fluidizing medium for the distributor 131 is provided by the airline 154; the fluidizing medium for the first row of low temperature retorts 137 is provided through the airline 155; fluidizing medium for the second row of low temperature retorts 139 is provided by the airline 156; the distributor 141 is supplied by the line 157; the third row of retorts 142 is supplied through line 158; the U-shaped distributor 144 is supplied by the line 159. Overflow collection trough 144 is supplied by the line 160. The vertical retorts 145 are supplied by the lines 161, 161a and 161b, the latter two lines supplying the "idler" retorts (described hereinafter); and finally, the collective trough 146 is supplied by the line 162. As illustrated diagrammatically, the various lines enter the apparatus at temperature levels generally corresponding to the temperature of the material which is to be fluidized by the medium which they carry. Thus the air within the lines has the opportunity to become preheated to a suitable extent before it enters the various fluidizing troughs.

One system for collecting fluidizing medium from the top of the various fluidizing chambers is illustrated in Figure 22 and comprises the collection manifold 163 into which collected gases from the tops of fluidizing chambers are discharged as follows; from the collection trough 146 by branch header 164, from the vertical retorts 145 and the U-shaped distributor trough 144 by the branch header 165, from the row of retorts 142 by the branch header 166, from the distributor trough 141 by the branch header 167, from the row of retorts 139 by the branch header 168, from the row of retorts 137 by the branch header 169, and finally from the distributor trough 131 by the branch header 170. It will be noted that the size of the manifold 163 progressively increases as the volume of gas fed into it increases.

The collection manifold 163 may suitably be mounted exterior to the plant with the branch headers extending inwardly through the end wall of the plant to make appropriate connection with the tops of the various fluidizing chambers. The gas, which is finally removed from the plant in the manifold 163, will be quite hot, and it may be expedient, therefore, after removing the dust therefrom to recirculate at least a portion of it for re-use as fluidizing medium in the manifold 151, or otherwise make use of the sensible heat contained in the gases, for instance, by using them as pre-heated combustion air for the furnace.

A feature of the illustrated arrangement of vertical retorts is the use of the overflow collection trough 154. This trough is U-shaped as indicated in Figure 23 and all, save two, of the vertical retorts 145 discharge overflow into this trough through their overflow pipes 171. The other two retorts 145A which are situated at the ends of the arms of the U formed by the arrangement of the vertical retorts are "idler" retorts. These idlers are in all respects similar to the other vertical retorts 145 but instead of being fed from the distributor trough 144 they are fed from the overflow trough 154 by means of the chute 172.

The plant layout described above has the basic advantage that it may be combined with a steam generating plant using the same furnace space and the same fuel both for calcination and generation of steam. Thus, without going into detail as to the actual structure involved, which is conventional, it will be obvious that the use of water walls for lining the non-active walls of the furnace space, the use of water cooled structural members for supporting the various retorts and the positioning of furnace tubes, such as indicated at 173 within the radiant zone of the combustion space 149, will lead to the recovery of all of the sensible heat produced by combustion of the fuel which does not leave the plant in the calcined material, the spent fluidizing gases, or the flue gases. When it is remembered that a large proportion of the sensible heat in the hot calcined product can be recovered in usable form, by passing these products through a cooling trough of the type described in copending application Serial No. 237,032 and that the heat in the spent fluidizing gases may be recovered to a large extent by using these gases as preheated combustion air, it will be realized that an extraordinarily high degree of heat efficiency can be obtained.

Another form of plant layout which is suitable for the calcination of materials up to a final temperature exceeding 1,000° C. is illustrated in Figures 25, 26 and 27. The layout illustrated is based on the assumption that the material to be calcined is a fine metallic hydroxide which requires about 50% of the total heat at a level between about 250 and 350° C., about 25% between about 350 and 550° C. and about 25% between about 550 and 1,000° C., the calcination having to be brought up to 1,000° C. in order to effect change in the lattice structure of the oxide with a slight exothermic effect at 1,000° C.

In this plant, the flow of material which can best be followed from Figure 26 is as follows: material enters through the feed chute 175 and distributor 176 from where it flows into a bank of horizontal retorts 177 operating at 250 to 350° C. The flow through the retorts in bank 177 will be slow owing to the use of a relatively large number of retorts in parallel relationship. From the bank 177, the material flows into a second distributor 178 which divides the flow into eight streams flowing through a second bank 179 of eight retorts. Since the heat requirements of the system between 350 and 550° C. is considerably smaller than is the case in bank 177 of retorts where an endothermic dehydration step is taking place, a faster flow is desirable which provides for less absorption of heat within this temperature range. Product from the bank 179 is collected in the distributor trough 180 and is again redistributed, this time being divided into five streams flowing into a bank of five deep high temperature retorts 181. Here the product is brought up to 1,000° C. with some assistance from the exothermic heat of transition liberated at this stage. The high temperature retorts in the bank 181 discharge into collecting trough 182 which in turn will discharge into a cooler (not shown) where about 30% of the total heat of calcination may be recovered in the form of process steam.

Fluidizing medium for the plant is flue gas from the combustion of a gaseous fuel in gas pre-heating chambers 188 and 189. The high temperature retorts 181 are supplied through the headers 190 and the ports 191 opening into their respective gas chambers. The banks of retorts 179 and 177 and the distributor 176 are fed fluidizing medium by means of ducts (not shown) leading from the pre-heating chambers 188 and 189.

Two systems are provided for the collection of fluidizing gas from the tops of the fluidizing chambers. The first system comprising ducts 192, 193, 194, 195, 196 and 197 collects gas released from the retorts 188 and the retorts 179, which is free of moisture and contains dust of the already dehydrated product. The other system comprising ducts 198, 199 and 200 collects the moisture laden gases from the bank of retorts 177 and dust of the feed material.

In this example, a low caloric gas is assumed as fuel. Combustion takes place in the furnace areas 201, using very hot primary air from the regenerative chambers 188, heating by direct contact the high conductance walls 202 of the retorts. The hot flue gas expands then through spaces 203 and 204 into the middle section where it sweeps past the medium temperature retorts 179, until it is channelled in the narrow channels 205 between the retorts of the uppermost bank 177. This slows down the overall rate of flow of the flue gas and assists in the exchange of heat between the gas and the retorts. The combustion gases leave the calciner through its flue 206.

It will be observed from the foregoing that the elements of the present invention provide a large degree of versatility in the layout of the calcining plant and that such layout may be arranged to take into account the heat requirements of the material being processed at various temperature levels so that heat may be supplied to the material at various temperatures in substantially the quantities required in order most efficiently to carry out the operation.

The apparatus of the invention is limited in application to certain definite classes of solid materials which may be defined as "finely divided normally fluidizable pulverulent and non-agglutinating powders." By "finely divided," we mean having a particle size below 24 mesh and preferably below 65 mesh U. S. standard screen. By "normally fluidizable," we mean materials which fluidize easily when kept in a stream of gas having a space velocity above the characteristic "minimum fluidizing velocity" of the material being treated and which do not tend to form under those conditions specific structural agglomerations sometimes referred to as aero-thixotropic gels. By "pulverulent," we mean easily flowing powdery materials and by "non-agglutinating," we mean materials which do not agglomerate, cake or clinker under the conditions of heating in the process being carried out.

In spite of this limitation, the class of solids that can be treated to advantage in apparatus according to the invention is very large and includes finely ground metallic ores, flotation tailings, pure metal oxides, mineral pigments, clays and minerals.

The low temperature system described in the above specification can be used to particular advantage in the calcination of kaolin, activated alumina, bauxite, fuller's earth, yellow and brown iron pigments, and various metallic hydroxides.

The high temperature system described above can be applied with particular advantage to the calcination of normal alumina, titanium oxide, dark iron pigments, metallic carbonate and sulphide ores—to mention only a few of the numerous materials capable of being successfully treated in this apparatus.

In addition, the apparatus can be adapted for a wide variety of industrial processes involving chemical reactions between solvents and gases and chemical reactions in the solid state. Such reactions include, for instance, calcination of petroleum coke, treatment of semi-coke, chlorination and fluorination and the like.

The particular features which characterize the apparatus of this invention which are not present in previous apparati for carrying out similar purposes include the following:

1. Versatility in plant design and layout.
2. Ease of maintenance with no moving parts inside the plant.
3. Accuracy of control of the heat delivery to the material within each temperature range.
4. Outstanding heat economy which may be enhanced in some cases by laying the plant out to share furnace space with a steam generating plant.
5. Compactness enabling large tonages to be treated with a minimum of plant space.
6. The most readily available fuel may be used since contamination of the product by combustion gases is avoided.
7. Dusting losses are a minimum owing to accuracy of control of the fluidizing medium supplied to the fluidizing chambers while what dust is obtained may be collected from all the units operating within a given temperature range and returned to the system at the point from which they are withdrawn.

Many other advantages of the apparatus of the invention will be apparent from the foregoing specification to those skilled in the art.

What we claim as our invention is:

1. Apparatus for retorting finely divided, fluidizable solid materials comprising; two sidewalls composed of high heat conductivity material spaced from 6" to 36" apart, and defining a generally horizontal, elongated, trough shaped retorting chamber therebetween having a height which is substantially greater than its width; a porous diaphragm extending between said side walls and forming the bottom of said retorting chamber, said diaphragm having substantial resistance to flow of fluidizing gas therethrough; means for supplying a controlled flow of fluidizing gas upwardly through said porous diaphragm; top closure means for said retorting chamber extending between said side walls; means for exhausting spent fluidizing medium from the upper regions of said retorting chamber; means including material supply and discharge means for maintaining within said retorting chamber a relatively deep, horizontally moving bed of finely divided fluidized solid material; and means distinct from said fluidizing gas for heating the outside of said sidewalls to a temperature higher than the temperature of said fluidizing gas to transfer through said sidewalls heat requisite for the retorting of the fluidized material contained in said bed.

2. Apparatus for retorting finely divided, fluidizable solid material comprising; two sidewalls composed of high heat conductivity refractory metal spaced from 6" to 36" apart, and defining a generally horizontal, elongated, trough shaped retorting chamber therebetween having a height which is substantially greater than its width; a porous diaphragm extending between said side walls and forming the bottom of said retorting chamber; said diaphragm having substantial resistance to flow of fluidizing gas therethrough; means for supplying a controlled flow of fluidizing gas upwardly through said porous diaphragm; top closure means for said retorting chamber extending between said side walls; means for exhausting spent fluidizing medium from the upper regions of said retorting chamber; means including material supply and discharge means for maintaining within said retorting chamber a relatively deep, horizontally moving bed of finely divided fluidized solid material; and means distinct from said fluidizing gas for heating the outside of said sidewalls to a temperature higher than the temperature of said fluidizing gas to transfer through said sidewalls heat requisite for the retorting of the fluidized material contained in said bed.

3. A retort for finely divided, fluidizable solid material formed as a unitary structure and comprising; two sidewalls composed of high heat conductivity refractory metal spaced from 6" to 36" apart, and defining a generally horizontal, elongated, trough shaped retorting chamber therebetween having a height which is substantially greater than its width; a porous diaphragm having substantial resistance to flow of fluidizing gas therethrough extending between said side walls and forming the bottom of said retorting chamber, said sidewalls being joined together below said diaphragm to provide a gas chamber for fluidizing gas; means for supplying a controlled amount of fluidizing gas to said gas chamber for passage upwardly through said porous diaphragm; side walls being joined together above said retorting chamber to form top closure means therefor; means for exhausting spent fluidizing medium from the upper regions of said retorting chamber; means including material supply and discharge means for maintaining within said retorting chamber a relatively deep, horizontally moving bed of finely divided fluidized solid material within said retorting chamber; and means distinct from said fluidizing gas for heating the outside of said sidewalls to a temperature higher than the temperature of said fluidizing gas to transfer through said sidewalls heat requisite for the retorting of the fluidized material contained in said bed; said sidewalls having a cross-sectional profile which is generally curvilinear and free from sharp corners.

4. A retort for finely divided, fluidizable solid material formed as a unitary structure and comprising; two sidewalls composed of high heat conductivity refractory metal spaced from 6" to 36" apart, and defining a generally horizontal, elongated, trough shaped retorting chamber therebetween having a height which is substantially greater than its width; a porous diaphragm having substantial resistance to flow of fluidizing gas therethrough extending between said side walls and forming the bottom of said retorting chamber, said sidewalls being joined together below said diaphragm to provide a gas chamber for fluidizing gas; means for supplying a controlled amount of fluidizing gas to said gas chamber for passage upwardly through said porous diaphragm; said side walls being joined together above said fluidizing chamber to form top closure means therefor; means for exhausting spent fluidizing medium from the upper regions of said retorting chamber; means including material supply and discharge means for maintaining within said retorting chamber a relatively deep, horizontally moving bed of finely divided fluidized solid material within said retorting chamber; means distinct from said fluidizing gas for heating the outside of said sidewalls to a temperature higher than the temperature of said fluidizing gas to transfer through said sidewalls heat requisite for the retorting of the fluidized material contained in said bed; and a longitudinal outwardly extending rib secured to the outside of each sidewall at a level corresponding to the normal level of material within said fluidizing chamber, said ribs being adapted to support the retort upon suitable supporting means.

5. Apparatus for retorting finely divided, fluidizable solid material comprising; two sidewalls composed of high heat conductivity ceramic material spaced from 6" to 36" apart, and defining a generally horizontal, elongated, trough shaped retorting chamber therebetween having a height which is substantially greater than its width; a porous diaphragm formed from porous highly heat resistant material and having substantial resistance to flow of fluidizing gas therethrough extending between said side walls and forming the bottom of said retorting chamber; means for supplying a controlled flow of fluidizing gas upwardly through said porous diaphragm; top closure means for said retoring chamber extending between said side walls; means for exhausting spent fluidizing medium from the upper regions of said retorting chamber; means including material supply and discharge means for maintaining within said retorting chamber a relatively deep, horizontally moving bed of finely divided fluidized solid material within said retorting chamber; and means distinct from said fluidizing gas for heating the outside of said sidewalls to a temperature higher than the temperature of said fluidizing gas to transfer through said sidewalls heat requisite for the retorting of the fluidized material contained in said bed.

6. Apparatus for retorting finely divided, fluidizable solid material comprising; two sidewalls composed of high heat conductivity ceramic material spaced from 6" to 36" apart, and defining a generally horizontal, elongated, trough shaped retorting chamber therebetween having a height which is substantially greater than its width; a porous diaphragm formed from porous highly heat resistant material and having substantial resistance to flow of fluidizing gas therethrough extending between said side walls and forming the bottom of said retorting chamber; means for supplying a controlled flow of fluidizing gas upwardly through said porous diaphragm; top closure means for said retorting chamber extending between said side walls; means for exhausting spent fluidizing medium from the upper regions of said retorting chamber; means including material supply and discharge means for maintaining within said retorting chamber a relatively deep, horizontally moving bed of finely divided fluidized solid material within said retorting chamber; means distinct from said fluidizing gas for heating the outside of said sidewalls to a temperature higher than the temperature of said fluidizing gas to transfer through said sidewalls heat requisite for the retorting of the fluidized material contained in said bed; and burner means arranged to direct flame upwardly into said fluidizing chamber from the level of said diaphragm as an auxiliary source of heat for heating said material.

7. A plant for the heat treatment of finely divided fluidizable solid materials comprising a plurality of superposed rows of horizontal retorts, each said row containing a different number of retorts, and each said retort comprising; two sidewalls composed of high heat conductivity material spaced from 6" to 36" apart, and defining a generally horizontal, elongated, trough shaped retorting chamber therebetween having a height which is substantially greater than its width; a porous diaphragm extending between said side walls and forming the bottom of said retorting chamber, said diaphragm having substantial resistance to flow of fluidizing gas therethrough; means for supplying a controlled flow of fluidizing gas upwardly through said porous diaphragm; top closure means for said retorting chamber extending between said side walls; means for exhausting spent fluidizing medium from the upper regions of said retorting chamber; means including material supply and discharge means for maintaining within said retorting chamber a relatively deep, horizontally moving bed of finely divided fluidized solid material within said retorting chamber; means distinct from said fluidizing gas for heating the outside of the sidewalls of each retort to a temperature higher than the temperature of said fluidizing gas to transfer through said sidewalls heat requisite for the retorting of the fluidized material contained in said bed; and means for distributing the discharge of all retorts in one of said rows uniformly amongst all of the retorts in the next lower row.

8. A plant for the heat treatment of finely divided fluidizable solid materials comprising a plurality of superposed horizontal rows of horizontal retorts, at least one of said rows containing a different number of retorts than the row next above it, the retorts in at least the uppermost of said rows each comprising; two sidewalls composed of high heat conductivity metal spaced from 6" to 36" apart, and defining a generally horizontal, elongated, trough shaped retorting chamber therebetween having a height which is substantially greater than its width; a porous diaphragm having substantial resistance to flow of fluidizing gas therethrough extending between said side walls and forming the bottom of said retorting chamber; means for supplying a controlled flow of fluidizing gas upwardly through said porous diaphragm; top closure means for said retorting chamber extending between said side walls; means for exhausting spent fluidizing medium from the upper regions of said retorting chamber; means including material supply and discharge means for maintaining within said retorting chamber a relatively deep, horizontally moving bed of finely divided fluidized solid material within said retorting chamber; the retorts in at least the lowermost of said rows comprising; two sidewalls composed of high heat conductivity ceramic material spaced from 6" to 36" apart, and defining a generally horizontal, elongated, trough shaped retorting chamber therebetween having a height which is substantially greater than its width; a porous diaphragm formed from porous highly heat resistant material and having substantial resistance to flow of fluidizing gas therethrough extending between said side walls and forming the bottom of said retorting chamber; means for supplying a controlled flow of fluidizing gas upwardly through said porous diaphragm; top closure means for said retorting chamber extending between said side walls; means for exhausting spent fluidizing medium from the upper regions of said retorting chamber; means including material supply and discharge means for maintaining within said retorting chamber a relatively deep, horizontally moving bed of finely divided fluidized solid material within said retorting chamber; means for distributing the discharge of all the retorts in each of said superposed rows uniformly amongst all the retorts in the next lower row; fluidizing gas supply and distribution means for providing fluidizing medium to each of said retorts; mean for the collection of spent fluidizing medium from each of said retorts; and means distinct from said fluidizing gas for applying heat to the outside walls of each said retorts to heat said outside walls to a temperature higher than the temperature of said fluidizing gas whereby to heat the material within each retort by heat transferred through the sidewalls thereof.

9. A plant as defined in claim 7 in which said means for heating the outside of the sidewalls includes means to subject each successive row of retorts to a higher temperature than the row immediately above it, and in which the number of retorts in each row and their cross sectional area is predetermined in accordance with the calculated quantity of heat required by the material within the range of temperatures through which it is heated in said row to carry out the operation being performed.

10. A plant as defined in claim 7 in which said means for distributing the discharge from all of the retorts in one of said rows uniformly to all of said retorts in the next lowermost of said rows comprises a fluidizing trough disposed substantially at right angles to said superposed rows of retorts and arranged to receive on one side thereof the discharge from all the retorts in one row, a plurality of discharge openings corresponding in number to the number of retorts in the next lowermost row thereof in the other side of said fluidizing trough, said openings all being on the same level, and means for delivering the material discharged from each of said discharge openings to one of said retorts in said next lowermost row.

11. A plant as defined in claim 10 in which said fluidizing trough comprises a longitudinally disposed vertical underflow baffle diving said fluidizing trough longitudinally and substantially centrally into a feed section to receive material, and a discharge section from which material is discharged through said discharge openings.

12. A plant for the heat treatment of finely divided fluidizable solid materials comprising at least one horizontal row of horizontal retorts, each retort in said row comprising two heat-conducting side walls defining a space therebetween from about 6" to about 36" wide; top and bottom closure means for said retort; a horizontal porous diaphragm secured within said retort dividing the same throughout the length thereof into a gas chamber portion therebelow and a fluidizing chamber having a height substantially greater than its width thereabove; means for supplying a regulated flow of material to be treated to said fluidizing chamber at one end thereof; means for withdrawing material from the other end of said fluidizing chamber; means for maintaining a deep horizontally flowing fluidized bed of said material within said fluidizing chamber, said means including means for supplying a regulated amount of fluidizing medium to said gas chamber and means for withdrawing gases released from said fluidized bed from the top of said retort; means for heating said heat transmitting walls from without said retorts; and a plurality of vertical retorts each below the lowermost of said rows of said horizontal retorts, said said vertical retorts each having a cross section which is between 6" and 36" in its major dimension, means for admitting material to the top of said vertical retorts, means for withdrawing material from a point adjacent the bottom of each of said vertical retorts; means for passing a controlled flow of fluidizing medium upwardly therethrough to fluidize the material undergoing treatment therein; overflow means for each of said vertical retorts for maintaining a predetermined level of fluidized material therein; means for distributing the material to be treated uniformly to each row of horizontal retorts from the discharge of the next uppermost row thereof; and means for distributing the discharge from the retorts in the lowermost row of said horizontal retorts uniformly amongst said vertical retorts, said vertical retorts being arranged to surround a space suitable for housing the combustion chamber of a furnace.

13. A plant as defined in claim 12 comprising a fluidizing trough, means for discharging overflow from all of said vertical retorts into said fluidizing trough, at least one vertical idler retort and means for discharging material from said fluidizing trough into said idler retort.

References Cited in the file of this patent

UNITED STATES PATENTS

| | | |
|---|---|---|
| 254,524 | Woodruff et al. | Mar. 7, 1882 |
| 616,474 | Lanyon | Dec. 27, 1898 |
| 2,071,082 | Moore | Feb. 16, 1937 |
| 2,203,821 | Hinchman | June 11, 1940 |
| 2,258,367 | Saladin | Oct. 7, 1941 |
| 2,316,664 | Brassert et al. | Apr. 13, 1943 |
| 2,371,619 | Hartley | Mar. 20, 1945 |
| 2,513,369 | Shaw | July 4, 1950 |
| 2,520,637 | Henwood | Aug. 29, 1950 |
| 2,529,366 | Bauer | Nov. 7, 1950 |
| 2,548,642 | White | Apr. 10, 1951 |
| 2,654,659 | Friedman | Oct. 6, 1953 |
| 2,658,742 | Suter et al. | Nov. 10, 1953 |